Jan. 30, 1968
V. E. WEISS ET AL  3,366,484
PROCESS FOR PREPARING A FILLED READY-TO-EAT
BREAKFAST CEREAL AND THE RESULTING PRODUCT
Filed Sept. 1, 1964
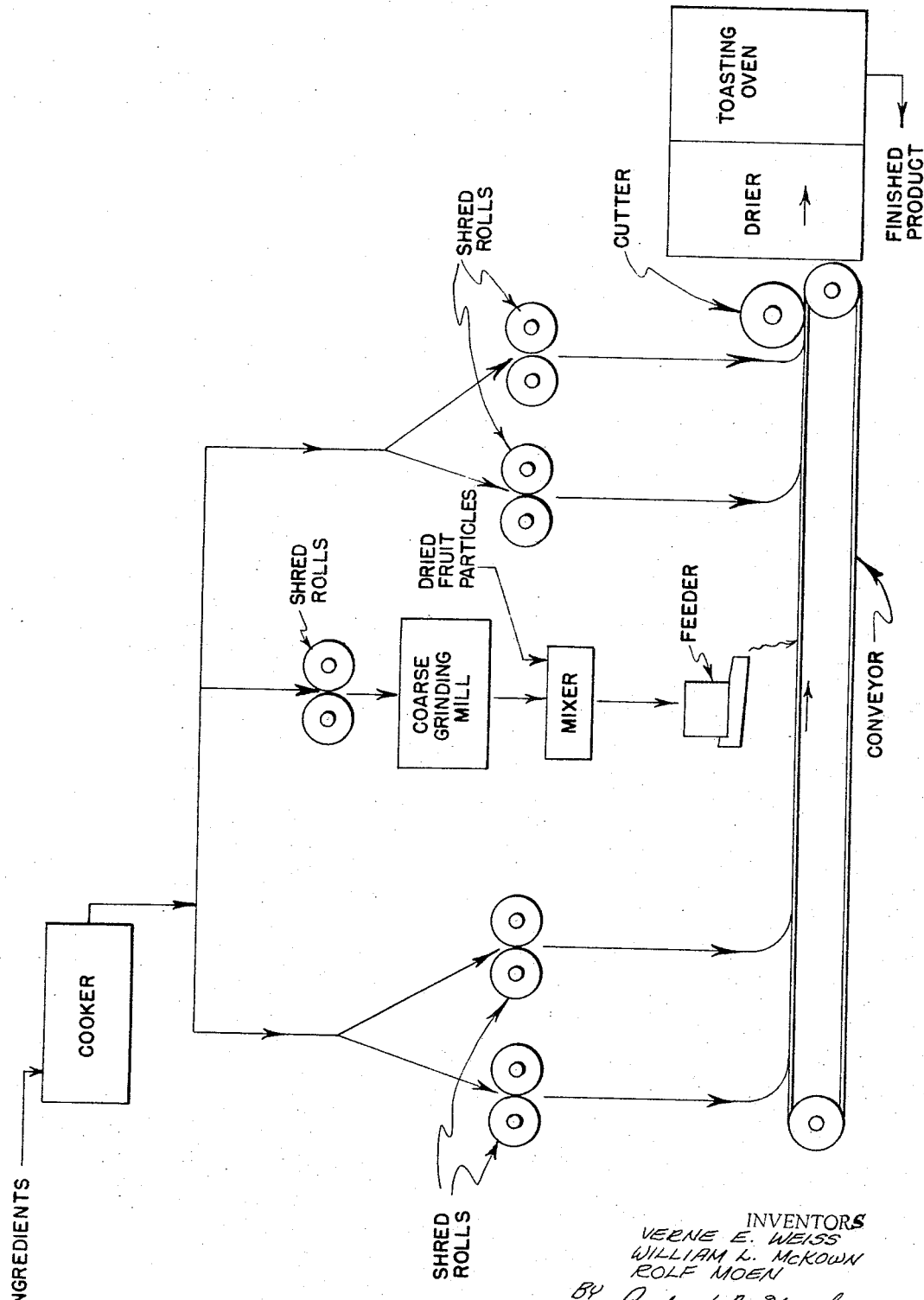
INVENTORS
VERNE E. WEISS
WILLIAM L. McKOWN
ROLF MOEN
BY Robert B. Hughes
ATTORNEY

United States Patent Office 3,366,484
Patented Jan. 30, 1968

3,366,484
PROCESS FOR PREPARING A FILLED READY-TO-EAT BREAKFAST CEREAL AND THE RESULTING PRODUCT
Verne E. Weiss and William L. McKown, Minneapolis, and Rolf Moen, Hopkins, Minn., assignors to General Mills, Inc., a corporation of Delaware
Filed Sept. 1, 1964, Ser. No. 393,647
13 Claims. (Cl. 99—83)

ABSTRACT OF THE DISCLOSURE

Unit of a ready-to-eat breakfast cereal comprised of a toasted cereal dough shell surrounding a mixture comprised of crumbs of cooked dough mixed with particles of dried fruit.

---

This invention relates to a breakfast cereal of the ready-to-eat variety and to a process for making the same.

In attempting to improve savoriness, nutritional value and other qualtities of ready-to-eat breakfast cereals, efforts have long been made to contrive acceptable methods of incorporating many different ingredients with the grain derived portion of the breakfast cereals, and a good deal of this effort has been directed particularly to finding desirable methods of adding fruit, fruit products, and fruit simulated products to the grain derived portion. While the problems encountered generally are, understandably, many and varied, the particular problems involved in utilizing fruit, fruit products, or fruit simulated products or the like as one of the breakfast food ingredients are especially difficult, and are, to a degree, somewhat illustrative of problems encountered generally in adding many other types of ingredients.

Mixing fresh fruit with breakfast cereal has, of course, long been a popular method of preparing a breakfast dish, so it has for many years been recognized as a desirable end to produce a fruit and cereal product that can be sold as a shelf item to the ultimate consumer, and yet keep some of the character of fresh fruit in the product. It is impractical, of course, to add fresh fruit as an ingredient to be packaged with the finished cereal product (e.g. flakes, biscuits), primarily because of the rapid rate of spoilage of the fruit. Thus the approach has been taken to add dried fruit to the finished cereal product to effect a packaged breakfast cereal having a sufficiently long "shelf life," this having been done commercially with raisins. However, there are problems and limitations in this general approach. It is not desirable to package the fruit and cereal product separately because of the inconvenience to the ultimate consumer. On the other hand, there are difficulties involved in distributing the dried fruit somewhat uniformly throughout the cereal product; and even after this has been accomplished, in the handling of the packaged product either in shipping and afterwards by the consumer, there is with some products a tendency for the fruit to separate from the cereal, and to accumulate and possibly agglomerate.

Beyond the difficulties of accumulation and agglomeration, one of the major problems in so mixing dried fruit and a cereal product is that of the gradual transfer of moisture from the fruit to the cereal product. (For clarity, in discussing generally any breakfast cereal containing a fruit or fruit simulated product, the grain derived or cereal portion, i.e. flakes, biscuits, etc. will be called the "cereal portion" or "cereal product," the fruit related portion, i.e. fruit or fruit simulated portion, will be called the "fruit portion" or "fruit product," and the combination of these, which is generally the total packaged product, will be called a "ready-to-eat cereal," or "ready-to-eat breakfast cereal," or "breakfast cereal.") What are commercially known as "dried" fruits still have a moisture content generally between fifteen (15%) percent and thirty (30%) percent, while most all cereal products must remain at or below about four (4%) percent moisture content to stay reasonably crisp. Thus when the fruit is mixed in with the cereal product and permitted to stand for a period of time, the dried fruit will lose moisture to the cereal, with the fruit becoming excessively tough or hard (the degree of toughness depending to some extent on the selection of fruit) and the cereal becoming soggy. It has been alleged that bran flakes, being more flinty than most other flakes, do not show the effects of moisture absorption to the same extent as do the other flakes, and thus have been used in this manner (i.e. mixed with raisins) with some success. However, in this case the choice of cereal product is accordingly limited, as is the choice of fruit, and the dried fruit still has a tendency to be tough due to the dehydration thereof.

Another approach to solve the difficulties of adding fruit or fruit-like products to cereal is to encase dried fruit pieces within moist cereal shreds, and then to toast and dry the product. Although this circumvents the problems of accumulation and agglomeration, there are significant limitations. For example, the fruit pieces must be encased in a shredded cereal product which is alleged to be the only cereal product capable of withstanding the influence of combination with dried fruits, but even so the fruit pieces tend to be tough and the cereal portion less crisp than would be desired. Also there are critical limitations in the manner in which the cereal product must be processed or toasted to obtain the desired quality of the cereal shreds without degrading the fruit pieces, but even when operating within these limitations, there are problems in maintaining a desired fresh fruit character.

Attempts to incorporate fruit into cereal by adding fresh fruit in the form of pastes, purees and juices to cereal doughs which are then made into cereal products have encountered difficulties similar to that just previously mentioned. When the dough with the fruit product is subjected to elevated temperatures involved in cooking or otherwise processing the same, various qualities (e.g. flavor) of the fruit product are degraded.

Accordingly, it is an object of the present invention to provide a new and improved ready-to-eat breakfast cereal and a process for making the same, in which, in addition to the grain derived ingredient or ingredients ordinarily used in breakfast cereals, a fruit ingredient is utilized in a very advantageous manner to circumvent prior art problems such as those recited previously herein and to provide a delectable ready-to-eat breakfast cereal having a very desirable fresh fruit character.

In the present invention fruit which is dried to a very low moisture content (i.e. less than 5%) and is in a finely divided or powdered form, is mixed with shreds or crumbs of cooked dough. This dough-fruit mixture is encased in shells of cooked dough (such as that which is mixed with the fruit). This is accomplished by laying down a first sheet of dough, depositing the dough-fruit mixture on the sheet, and then laying down a second sheet of dough. The dough sheets are then cut in a crisscross pattern with blunt edges to bond the dough sheets along the cutting lines so as to form units or pellets consisting of a dough shell and a dough-fruit interior. These units are first dried to a low moisture level (i.e. 5% or less) and then subjected to a short, intense heating period to moderately toast only the shell portion of each unit.

The biscuit-like units can then be packaged for eventual consumer use.

In the evaluation of various aspects of this process and product, a most gratifying discovery was that when servings of a breakfast cereal made according to this process were actually eaten, not only did this particular fruit-cereal product have to a marked degree a fresh fruit character and create the sensation of a delectable taste, but the texture or "feel" of the same was quite delicate and generally very desirable. It would seem to be a reasonable assumption that the dried fruit particles, though quite small, would individually be somewhat hard, and would collectively have a texture that would be other than delicate. However, this was found not to be the case. It can be theorized, by way of explanation, that when the product, being served with milk and/or cream, is masticated, the very small fruit particles, interspersed with the cereal crumbs, quickly pick up moisture when the cereal shell is crushed in the mouth of the consumer, and the immediate effect produced is this delectable taste and texture, which have to a very marked degree a fresh fruit character. Or perhaps the fruit particles do maintain a certain hardness, but in being mixed intimately with the relatively soft cereal crumbs and being quite small, the hardness of the particles is obscured. Perhaps both of these speculations are partial explanations, but regardless of the validity of either or both, it is unmistakably clear that the texture of the product of this invention, as well as the flavor, is quite desirable, and a generally delectable fruit-cereal product is achieved.

Thus it may be stated as a further particular object of some significance to provide such a breakfast cereal wherein the fruit portion is sufficiently dry to be in moisture equilibrium with the crisp cereal portion, and yet the breakfast cereal has a delicate and desirable texture in addition to the other qualities (e.g. flavor, etc.) which make up a high quality breakfast cereal.

These and other objects and features of the invention will be more readily understood and appreciated from the following detailed description of the preferred embodiments thereof selected for purposes of illustration and shown in the accompanying drawing, in which:

FIGURE 1 is a diagrammatic sketch illustrating a preferred process of the present invention.

As illustrated in FIGURE 1, portions of the same dough, which is the cereal portion or grain derived portion of the breakfast cereal, are, or may be, used for each of the dough sheets as well as for the dough portion of the dough-fruit mixture used for the filler material. A suitable dough can be made from the following formulation:

| | Lbs. |
|---|---|
| Milled wheat | 10 |
| Sugar | 1.2 |
| Salt | 0.4 |
| Water | 5.2 |

The primary ingredients for the dough are grain particles and water: Other ingredients (as shown herein salt and sugar) are added in selected proportions primarily for flavoring. Various types of grain, such as corn, rice, barley, rye, sorghum, etc. or various combinations thereof could be used in this cereal formula; or other products such as starch could be substituted for use in combination with such grain products. Also various other flavoring ingredients in place of or in addition to those shown herein, such as molasses or various artificial flavorings, could also be used.

A suitable dough is obtained by mixing and cooking the cereal formula ingredients. One acceptable method of doing this is to pour the separate ingredients into a drum of a pressure cooker, which drum continuously rotates about a horizontal axis during the cooking of the ingredients contained therein. The rotation of the drum not only mixes the ingredients but also insures that they be cooked uniformly. When a batch of this cereal formula is cooked in such a pressure cooker at 20 lbs. per square inch gage pressure, the approximate desired cooking time is 1 hour. When the dough ingredients are being so cooked in a pressure cooker, water is added in the cooking chamber in the form of steam, and some of this moisture is often absorbed in the mixture, in which case a lesser amount of water may be used as an initial ingredient. It is to be understood of course that the amount of water added initially is, of itself, not critical, but should be such in relation to the amount of water either added or lost to the cooking process so that the moisture content of the dough after it is cooked is between about 25–35% by weight. Within this range, the dough is at a consistency where it can be formed in the subsequent operations of this process.

Another possible method of cooking the ingredients to form a dough is to premix the ingredients and then cook them by placing the mixed ingredients on a belt which then carries them through a cooking zone for a predetermined length of time. There are, of course, various methods by which such ingredients can be cooked to form a workable cereal dough. These are well known in the art, and it is well within the skill of the art to control the processing conditions of these various methods to prepare a workable cooked dough of good quality.

It is also possible to provide a suitable dough by taking a finished cereal product (such as Wheaties, Cheerios, or one of the types of corn flakes) and mixing the same with water. Dough so made is called a "reconstituted dough."

After the cereal ingredients are cooked to form a workable dough, a first portion of this dough is formed into a sheet. This can be done by passing the dough through a pair of sheeting rolls, or by extruding the dough into a sheet. Another method of preparing a sheet of dough which seems to be particularly desirable in the present invention is to lay down two or more layers of shreds. (This can be accomplished in the manner shown schematically in FIGURE 1, this method being to divide this first portion of the dough into two or more parts and feed each part into a respective set of two or more sets of shredding rolls, which in turn feed the shredded dough onto a conveyor.) Since this dough is at this time at a moisture content (i.e. about 25–35% moisture) where it is somewhat adhesive, these individual shreds tend to become bonded together during the remainder of the process.

The dough-fruit mixture which is the filler material, can be prepared in various ways, and can be done as follows: A second portion of the cooked dough is fed through a pair of shred rolls, and the resulting shreds are passed through a coarse grinding mill to form short shreds (i.e. one-eighth to a quarter inch long) or crumbs. These crumbs are then fed into a mixer with particles of dried fruit, and the resulting dough-fruit mixture is then spread (as by the feeder shown schematically in FIGURE 1) in a uniform layer over the first sheet of dough. In mixing the fruit particles with the dough crumbs, no attempt is made to further reduce the particle size of either ingredient, and the mixing is carried on only until the fruit particles are well distributed throughout the dough crumbs.

As indicated previously, the fruit portion of the dough-fruit filler is in finely divided form and consists of fruit which has been dried and ground to particles of the desired size. Various types of fruit or combinations thereof could be used, this depending of course upon the particular fruit character desired for the end product. The use of bananas, strawberries, or peaches has each been found to provide a very delectable end product. Other dried fruits, such as blueberries, pineapples, apples, etc. could also be used quite advantageously.

Desirably, the fruit powder used is made from fruit that has been freeze-dried (so as best to preserve its fresh fruit character). Also the moisture content of this fruit should not be above about 20% and is preferably 5% or below before being mixed with the dough crumbs; and shortly after the fruit is mixed with the dough crumbs, this mixture should be incorporated into the pellets and dried. The reason for this is that the fruit is reluctant to give up moisture and during this drying step, moisture is taken primarily from the cereal portion, with the fruit portion and the cereal portion slowly coming into moisture equilibrium some time after the completion of the entire process. However, below a certain moisture level (about two percent) the cereal portion is also reluctant to give up moisture. Hence, if the fruit powder is initially at a low moisture content (i.e. 5% or less), the drying can be done more easily.

The ratio of dough crumbs to fruit, of course, can be varied depending upon the quality of end product desired. A quite desirable product can be obtained by mixing 80% by weight of dough crumbs to 20% fruit, but for most fruits, when the percentage by weight of fruit in the mixture reaches as high as 50% of the total mixture, the texture of the end product becomes somewhat less desirable. The fruit particles should be fairly small, desirably of a size such that most all the particles would pass through a U.S. No. 16 screen. If the particles are of such a size as to be retained on a U.S. No. 12 screen, the resultant product acquires a texture somewhat less delicate than that desired for a high quality breakfast cereal.

Subsequent to distributing a uniform layer of the dough-fruit mixture on the first sheet, a second sheet is layed down to cover this dough-fruit mixture. As in the laying down of the first sheet, this second sheet can be formed by laying down two or more layers of shredded dough.

The two sheets of dough, with the fruit-dough mixture therebetween, are then cut both longitudinally and transversely with blunt edges which bond the two sheets one to the other along the lines of cutting. This forms the two sheets and the fruit-dough mixture into a plurality of pellets, each of which consists of a shell made up of portions from the first and second dough sheets, and a filler made up of the dough-fruit mixture, the pellets being shaped as rounded squares of a convenient size, e.g. three-eighths to a half inch across. The portions of the first and second layer that make up each shell are bonded one to another about the entire perimeter portions thereof, by virtue of the blunt cutting edges performing a sealing or bonding function in addition to their cutting.

For clarity of illustration one embodiment of the process of the present invention is shown schematically in FIGURE 1 as it might be carried out in a continuous process. Thus a first sheet of dough is laid down as two shredded layers onto a conveyor moving to the right in FIGURE 1. Next the dough-fruit mixture is laid down, and then the second sheet of dough is laid down as two layers of shreds. The dough for the sheets and the dough-fruit mixture is shown as emanating from the same source. The product is then carried to a cutter to form biscuits which are placed in a drier and then in an air oven.

As previously stated, the dough-fruit mixture is spread uniformly between the dough sheets, and thus some of this mixture will be embedded in the perimeter portions of each pellet. However, since the dough crumbs are somewhat moist and hence pliable, and the fruit particles are quite small, there is no problem in the blunt edges performing their cutting and bonding functions with respect to the first and second dough sheets.

The pellets, thus formed, are then dried at a moderate temperature until the moisture content of the dough reaches a level about 5% by weight. The maximum temperature at which this drying can be performed should not be so high as to degrade the fruit and it will vary somewhat depending upon the type of dried fruit used, but in most cases should be below about 200° F. With the dough in the pellets being at a moisture content of about 25%, a drying time of 45 minutes at a temperature of 150° F. will usually be sufficient to reduce the pellets to an overall moisture level of about 5%.

Subsequent to this drying operation, the pellets are subjected to a short intense heating period to toast only the outer portion of each pellet. This can be accomplished by placing the pellets in an air oven at a temperature of about 420° F. for a period of about 2½ minutes. It is not desirable to toast at too low a temperature (e.g. 350° F.), since to develop proper flavor in the outer portion of each pellet, it would be necessary to prolong the toasting to the extent that the quality of the fruit particles in the interior of the pellet would be degraded to some degree. Hence, for best results this toasting should be carried on at a temperature of about 360° F. or higher, and at this 360° F. temperature the toasting should not be carried on for as long as four minutes. Naturally, the toasting temperatures should not be so extreme (e.g. 600° F.) as to burn the exterior of the pellets.

Of course, other methods can be used to toast the pellets. For example, the pellets can be toasted in a fluidized bed of salt particles, or be toasted in a radiant heat oven.

The toasting will, of course, have a further drying effect on the pellets. In the end product, the moisture content of the cereal shell to be crisp and the cereal portion of the biscuit interior should not be above about 5%, and the fruit portion will be in moisture equilibrium with the cereal portion. The precise moisture content of the fruit particles will vary depending on the type of fruit used, but in any case will be below about 20%. If after the toasting, the product is not at the desired moisture content, it can be further dried at moderate temperatures (180° F. or below); however, in a commercial operation, it is usually most practical to so control the drying step prior to toasting that upon completion of the toasting the breakfast cereal is at the desired moisture content.

The invention is disclosed with more particularity in the following examples.

EXAMPLE I

The following ingredients are used to make a dough:

| | Lbs. |
|---|---|
| Wheat | 17 |
| Sugar | 2 |
| Malt sirup | 0.6 |
| Salt | 0.04 |

These ingredients are placed in a pressure cooker; 7 lbs. of water is added, and the ingredients are cooked at about 20 p.s.i. for about 1 hour. Sufficient water is added during the cooking process so that the cooked dough taken from the pressure cooker has a moisture content of about 30%. A first portion of this cooked dough is run through a set of shredding rolls, and a shredded sheet having a thickness of about .05 inch is laid down. A second portion of this cooked dough is run through a set of shredding rolls and then broken down in a coarse grinding mill to form a batch of dough crumbs. Dried raspberry particles (having a moisture content of about 5% and having a particle size such that they would pass through a U.S. No. 16 screen) are mixed with the dough crumbs in a ratio of about 20% raspberry particles to 80% dough crumbs. The dough-crumb mixture is then spread onto the shredded sheet. A second shredded sheet is laid down on top of the dough-fruit mixture. The product is then cut with a blunt edged knife both longitudinally and transversely to form a plurality of generally square biscuits, each of which is sealed around all four edges. The biscuits are then dried in an air oven at 180° for 30 minutes so that the overall moisture content of the same is reduced to about 5%. The biscuits are then toasted in an air oven at 400° F. for 3 minutes to form the finished product.

EXAMPLE II

The same process is followed as in Example I, except that the formulation for the dough is as follows:

| | Percent |
|---|---|
| Rice | 50 |
| Wheat | 35 |
| Sugar | 10 |
| Malt sirup | 3 |
| Salt | 2 |

EXAMPLE III

The same process is followed as in Example I, except that banana particles are used instead of raspberry particles.

EXAMPLE IV

The same process is followed as in Example I, except that strawberry particles are used instead of raspberry particles.

EXAMPLE V

The same process is followed as in Example I, except that peach particles are used instead of raspberry particles.

It should be understood that the foregoing is merely illustrative of a certain embodiment of the invention and many variations may be made by those skilled in the art without departing from the spirit and scope of the invention.

Now therefore we claim:

1. A unit of a ready-to-eat breakfast cereal, said unit comprising a toasted cereal dough shell containing therein an interior product which is a dough-fruit mixture comprising crumbs of cooked dough mixed with particles of dred fruit, said shell completely encloses the interior product.

2. The unit as recited in claim 1, wherein the moisture content of said dried fruit is below about 20%.

3. The unit of breakfast cereal as recited in claim 1, wherein the approximate particle size of the dried fruit is such that said particles will pass through a U.S. No. 12 screen.

4. The unit of breakfast cereal as recited in claim 1, wherein the interior product is such that the percentage by weight of dried fruit in the dough-fruit mixture is less than about 50%.

5. A unit of a ready-to-eat breakfast cereal comprising a toasted cereal dough shell containing therein a product which is a mixture of dried fruit and crumbs of cooked dough, said shell completely encloses the product, said fruit having a moisture content below about 20% and having an approximate particle size such that it will pass through a U.S. No. 12 screen, and the percentage by weight of fruit in the dough-fruit mixture is less than about 50%.

6. A process for making a ready-to-eat breakfast cereal, said process comprising:
   (a) laying down a layer of workable cooked cereal dough,
   (b) placing on said layer of cooked dough a mixture of dried fruit particles and cooked dough crumbs,
   (c) laying over this mixture a second layer of workable cooked cereal dough,
   (d) cutting with blunt edge means said first and second layers of dough into a plurality of pellets,
   (e) drying said pellets to about 5% moisture, and
   (f) toasting the outside of said pellets.

7. The process as recited in claim 6, wherein the fruit particles of said mixture are of an approximate size such that they will pass through a U.S. No. 12 screen.

8. The process as recited in claim 6, wherein the percentage of fruit by weight in the dough-fruit mixture is less than about 50%.

9. The process as recited in claim 8, wherein the fruit particles of said mixture are of an approximate size such that they will pass through a U.S. No. 12 screen.

10. The process as recited in claim 6, wherein said pellets are dried at a temperature below about 200° F.

11. The process as recited in claim 6, wherein said pellets are toasted at a temperature above 350° F. and below 600° F. less than about four minutes.

12. The process as recited in claim 6, wherein said pellets are brought to a final overall moisture content wherein the moisture level of the cereal portion is not more than about 5%.

13. A process for making a ready-to-eat breakfast cereal, said process comprising:
   (a) laying down a layer of workable cooked dough,
   (b) depositing on said layer a mixture of dried fruit particles and crumbs of cooked dough, the ratio by weight of fruit particles to cooked dough being less than about one to one, and said fruit particles having an approximate size such that they will pass through a U.S. No. 16 screen,
   (c) laying down a second layer of workable cooked dough over said mixture,
   (d) cutting with blunt edge means said first and second layers of dough into a plurality of pellets,
   (e) drying said pellets to about 5% moisture at a temperature below about 200° F.,
   (f) toasting the outside of said pellets at a temperature above about 350° F. and below about 600° F. for a time less than about four minutes.

References Cited
UNITED STATES PATENTS 2,693,419  11/1954  Gager _____ 99—83

RAYMOND N. JONES, *Primary Examiner.*